United States Patent Office 3,035,551
Patented May 22, 1962

3,035,551
BRAKE BOOSTER UNIT
Richard C. Rike, Dayton, Ohio, assignor to General Motors Corporation, Detroit, Mich., a corporation of Delaware
Filed Nov. 25, 1960, Ser. No. 71,780
11 Claims. (Cl. 121—41)

This invention relates to a brake booster unit and more particularly to a fluid means for transmitting a reaction force.

Various means have been employed within the booster unit for transmission of the reaction force from the pressurization chamber in the master cylinder to the manually operating means. The mechanical arrangement for transmitting the reaction force generally becomes somewhat complicated and is costly and for these reasons, it is not wholly a desirable means for transmitting the reaction force.

A resilient deformable medium such as rubber has also been employed for transmitting the reaction force in the brake booster unit. Although this type of a means has certain advantages over the mechanical means, in view of its simplicity, there are still disadvantages in using this type of a means for transmitting the reaction force. A rubber reaction force transmitting member can be employed to proportion the reaction force between the power wall and the manual control means to provide a proportioned reaction force transmitting medium. Rubber, however, varies considerably in its resilience in response to temperature changes. A force transmitting medium such as rubber fails to transmit the same force per unit deformation in compression as it does in expansion. For this reason, a true proportioned reaction force is not transmitted from the pressurization chamber in the master cylinder to the manual means for operating the brakes.

Accordingly, this invention is intended to overcome the shortcomings of the above types of means to transmitting a reaction force. This invention employs an incompressible fluid in combination with a gaseous fluid body for providing a delay reaction as well as a force transmitting medium which transmits an equal force for unit deformation of the fluid medium. The only fluid being compressed or expanded is the gaseous fluid which has a like force transmitting characteristic regardless of temperature and degree of deformation.

It is an object of this invention to utilize an incompressible fluid medium and an expansible gaseous fluid medium for transmitting the reaction force within the brake booster unit.

It is another object of this invention to utilize an incompressible fluid medium and an expansible gaseous fluid medium contained within a single enclosure for transmitting a reaction force from the force transmitting member to the manual operating means in the brake booster unit.

It is a further object of this invention to employ an incompressible fluid medium in combination with an expansible gaseous fluid medium closed within a single container within a power wall of a booster unit. An incompressible fluid medium provides a means for proportioning the reaction force between the power wall and the manual operating means of the reaction force in the brake booster unit.

It is a further object of this invention to employ an incompressible fluid medium and a gaseous fluid medium in combination within a single container positioned in the power wall of a booster unit. The fluids mediums proportion the reaction force between the power wall and the manual operating means and also provide a delayed reaction due to the compressibility of the expansible fluid medium.

It is a further object of this invention to employ an incompressible fluid medium and a gaseous fluid medium contained within a single enclosure. A single enclosure is positioned in the power wall to distribute the reaction force proportioning between the power wall and the manually operating means also provided delayed reaction when the booster unit is operated.

The objects of this invention are accomplished by placing the incompressible fluid medium and an expansible gaseous fluid medium within a single closed container. The closed container is then positioned between two cups to prevent abrasion of the container during operation.

The container and the cups are contained within the power wall of the booster unit. One of the ends of the power wall receives a force transmitting member which extends into the master cylinder for pressurizing fluid for operation of the vehicle brakes. The manual operating means extends into the power wall and contacts the portion of the rearward surface of a cup to receive a portion of the reaction force while the remaining portion is transmitted to the power wall as the brake booster unit is operated. A reaction force is transmitted through the incompressible fluid medium and the gaseous fluid medium to proportion the reaction force between the power wall and manual operating means. The expansible fluid provides for a delayed reaction. The reaction force is a build-up of force in proportion to the compression of the compressible gaseous fluid as the brake booster unit is operated.

Figure 1:
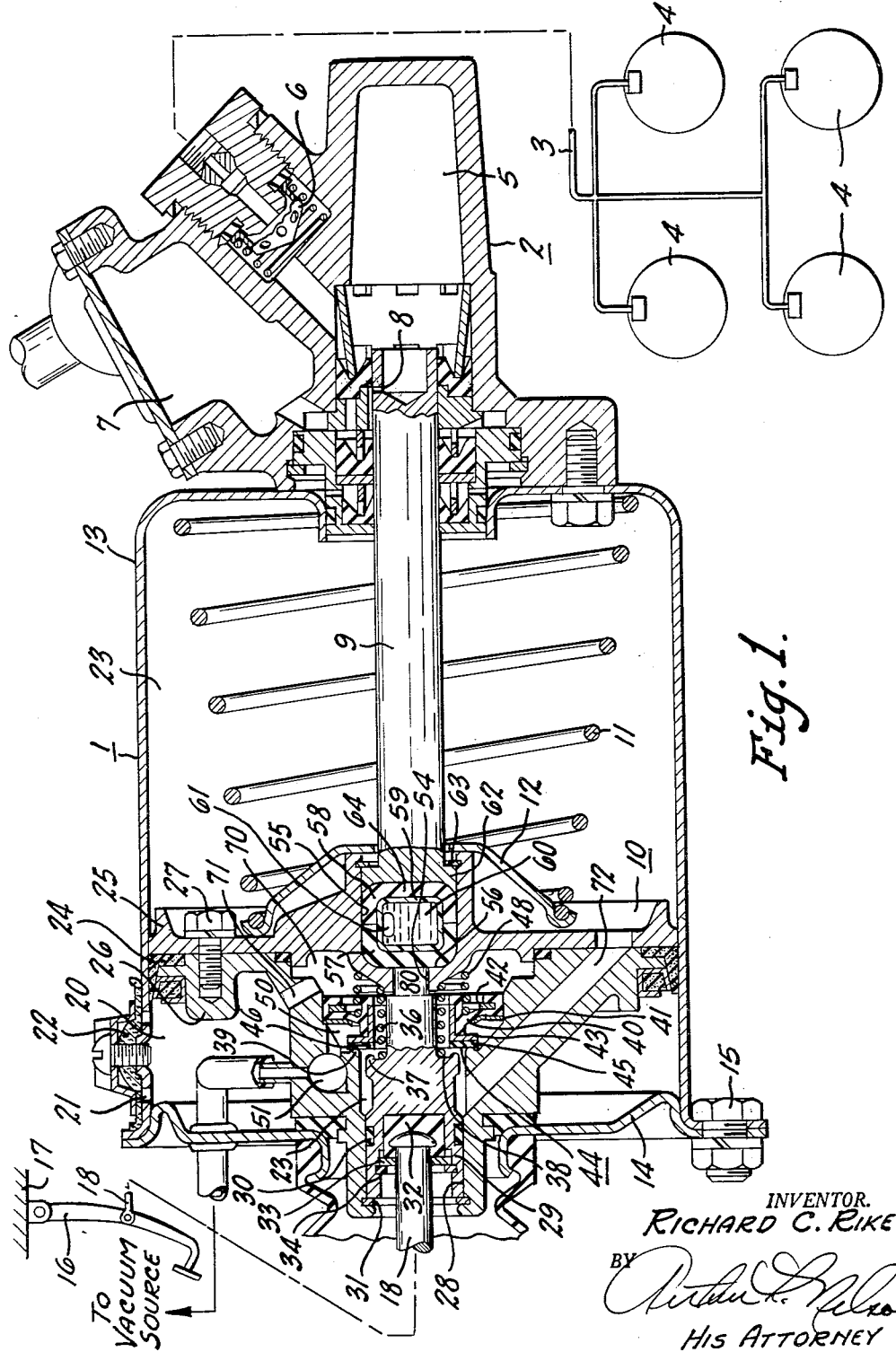
FIGURE 1 is a cross section view of the booster unit with the manual operating means and the plurality of wheel brakes shown in the schematic diagram.
Figure 2:
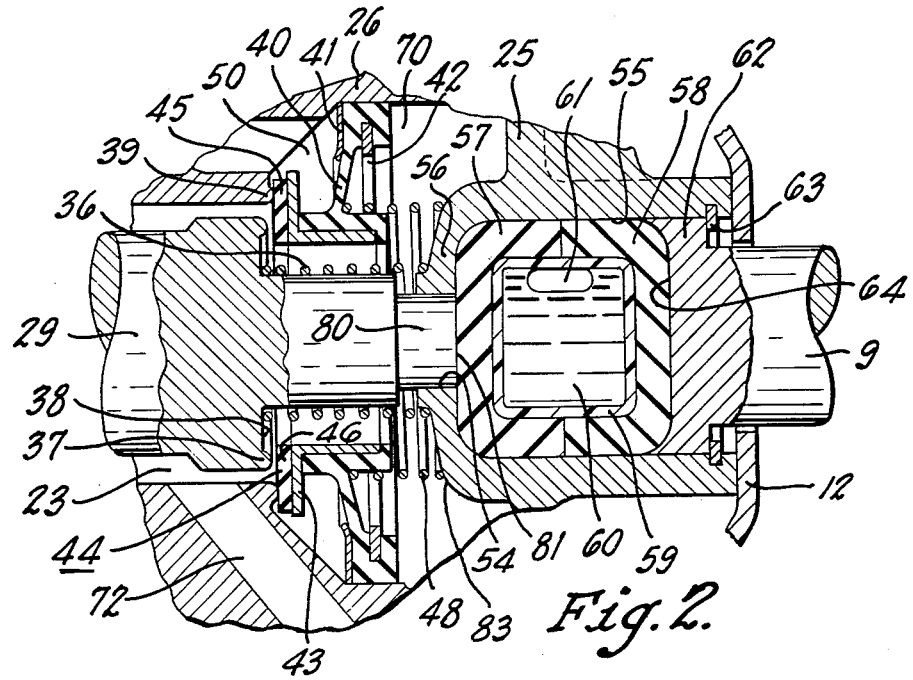
FIGURE 2 is an enlarged cross section view of the valve means in the retracted position and the reaction force of the transmitting means.
Figure 3:
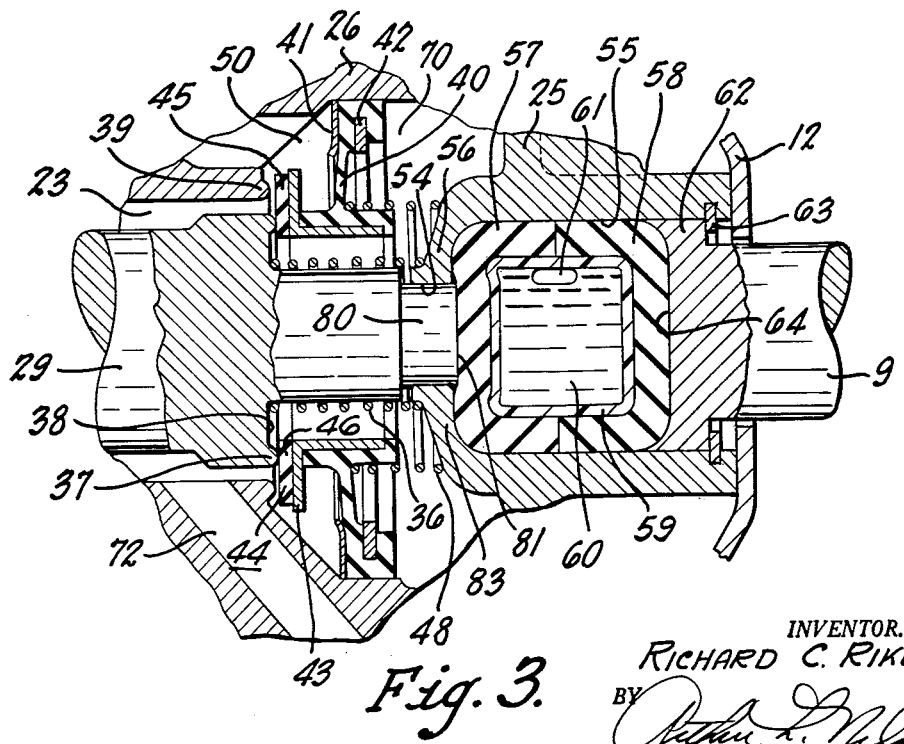
FIGURE 3 is an enlarged cross section view of the valve means in the operating position and the reaction means in the force transmitting position wherein the expansible fluid is compressed.

FIGURE 1 illustrates the brake booster unit in cross section and the relative position of the reaction force transmitting means within the power wall. The booster unit 1 is connected to a master cylinder 2. A master cylinder 2 is connected by a conduit means 3 to a plurality of wheel brakes 4. As the fluid is pressurized within the pressurizing chamber 5 of the master cylinder 2, the vehicle brakes are actuated. The conventional check valve assembly 6 is positioned in the outlet port of the master cylinder which is connected to the conduit means 3. A conventional reservoir having a chamber 7 is in communication with the pressurizing chamber 5 through the compensating port 8 in the force transmitting member 9. The force transmitting member 9 or plunger moves axially into the pressurizing chamber 5 thereby closing the compensating port 8 to pressurize fluid to actuate the vehicle brakes. The booster unit 1 includes a power wall 10 biased to the retracted position by the retraction spring 11 which is positioned between the spring seat 12 and the forward wall of the forward booster unit casing 13. The rearward section 14 of the booster unit 1 is fastened by a plurality of bolts 15. The manual operating means includes a brake pedal 16 pivotally mounted to the chassis 17. The push rod 18 is pivotally connected to the brake pedal 16 and extends into the rearward end of the booster unit casing.

The booster unit 1 is an air suspended booster unit. The constant pressure chamber 20 is in communication with the atmosphere through the plurality of both ports 21 and the filter 22. When the valve means is in its normally retracted position, the constant pressure chamber is in communication with a variable pressure chamber 23. In this position, the spring 11 biases the power wall 10 to its retracted position.

The power wall 10 has a seal means 24 on its outer periphery which forms the seal between the forward section 13 of the booster unit casing and the outer periphery of the power wall. The reaction housing 25 is connected to a valve housing 26 by the means of a plurality of bolts 27 which lock the seal means 24 on the outer periphery of a power wall 10. The valve housing 26 has a central opening 28 extending from the rearward end of the valve housing. The central opening 28 receives the air valve 29 which is sealed by its outer periphery by the seal 30. The air valve 29 seats on snap ring 31 in its rearward retracted position.

The air valve 29 also has a central opening extending from the rearward end to receive the rubber cup 32. The rubber cup 32 provides a seat for the push rod 18 when the push rod is inserted within the air valve 29. The cup 32 is maintained in its position within the opening in the air valve by the washer 33 and a snap ring 34. In this manner, the movement of the air valve 29 is controlled by a push rod 18 and the air valve spring 36.

The air valve element 29 has a cylindrical rearward portion for reception within a cylindrical opening 28 in the rearward end of the valve housing 26. The immediate portion of the valve element forms an annular ridge 37 which engages the valve seat. Radially inward from the annular ridge 37 is the radial wall 38 which engages the air valve spring 36. The forward end of the air valve spring 36 engages the portion of the reaction housing 25. In this manner, the air valve spring is compressively positioned between the air valve element 29 and the reaction housing 25 to bias the air valve 29 to its rearward retracted position.

The valve housing 26 forms an annular ridge 39 which operates as the vacuum element.

The cylindrical opening in the air valve housing extends forwardly to receive the valve seat diaphragm 40. A valve seat diaphragm is mounted adjacent to an annulus 41 which partially reinforces the diaphragm and forms a seating means for the diaphragm. The diaphragm is retained in its position by the snap ring 42 positioned within an annular recess of the diaphragm.

The valve seat diaphragm is bonded to the valve seat member 43. The valve seat member 43 has an axially extending flange connected to a radial flange which carries a rubber annulus 44 which forms the vacuum valve seat and the air valve seat. The radially outer portion of the annulus 44 forms the vacuum valve element 45 and the radially inner portion of the annulus 44 forms the air valve element 46. The valve seat spring 48 is positioned between the reaction housing 25 and the diaphragm at the radially inner portion of the diaphragm 40. The valve seat spring 48 biases the valve seat member to a contacting position with the vacuum valve element 39 in its retracted position.

The vacuum chamber 50 is in communication with the vacuum passage 51 which is in communication with a source of vacuum.

The reaction housing 25 has a cylindrical opening 55 extending rearwardly from the forward end to form a reaction chamber 64 for reception of the reaction means.

The forward end of the air valve element 29 has a cylindrical portion 80 extending through a mating opening 54 in the rearward end of the reaction housing 25. The central opening 55 extends rearwardly from the forward side of the reaction housing 25 to the wall 56 which receives the reaction force from the reaction means which is transmitted to the power wall 10. The central portion of the reaction means in the reaction chamber transmits a force to the air valve element 29.

The reaction means consists of a rear deformable cup 57 and a forward deformable cup 58. The cups 57 and 58 have an outer periphery of approximately the same diameter as the inner periphery of the reaction chamber 61. The cups 57 and 58 enclose a deformable container 59 which contains the noncompressible hydraulic fluid 60 and a compressible gaseous fluid 61. The container 59 is sealed to prevent any fluid leaking from the container. The container 59 is inserted within the cups 57 and 58 and then placed within the opening 55 of the reaction housing 25. The force transmitting member 9 has a rearward shoulder 62 which fits in the central opening 55 of the reaction housing 25. The shoulder 62 is retained within the position by the snap ring 63 which is inserted within the annular recess of a reaction housing 25. The gaseous fluid may be under any predetermined degree of pressure to provide the proper reaction force and proper delayed time for transmission of the reaction fluid to a manual operating means. For the most desirable results, it is intended that the valve means be in operation and the compensating port 8 be closed and a certain degree of pressurization of fluid within the pressurizing chamber 5 be encountered prior to any real noticeable "feel" in operation of a booster unit. It is noted that the snap ring 63 maintaining the shoulder 62 of the force transmitting member 9 confines the volume within the reaction chamber 54 to a predetermined volume. The volume, however, may be decreased during the transmission of the reaction force from the force transmitting member 9, to the push rod 18.

The operation of the booster unit will be described in the following paragraphs. The booster unit in its retracted position contains air of ambient pressure on the forward and rearward side of the power wall. The atmospheric pressure is permitted to enter through ports 21 to the constant pressure chamber 20. A pressure within the constant pressure chamber 20 is in communication with the air chamber 70 through the passage 71. The air is also permitted to pass through the valve means as the air valve element 29 is in spaced relation to the air valve seat 44. This position of the air valve provides communication between the air valve chamber 70 and the variable pressure chamber 23 through the passage 72. The vacuum valve element 39 is contacting the vacuum valve seat 45. This places the vacuum valve in the closed position and prevents communication between the vacuum chamber 50 and the variable pressure chamber 23 on the forward side of the power wall 10.

The expansible gaseous fluid 61 is expanded to its maximum volume within the reaction chamber 64.

As the brake pedal 16 is depressed, the push rod 18 moves axially forward within the booster unit. The push rod 18 carries the air valve element 29 forwardly until the annular ridge 37 contacts the air valve seat 46 thereby closing the air valve. Continued forward movement of the brake pedal 16 moves the air valve element 29 forwardly unseating the vacuum valve element 39 from the vacuum valve seat 45. The unseating of the vacuum element 39 from the vacuum valve seat 45 permits communication between the vacuum chamber 50 and the variable pressure chamber 23 thereby evacuating the variable pressure chamber 23 on the forward side of the power wall 10. With an evacuation on the forward side of the power wall 10, the differential pressure causes a forward movement of the power wall.

During the time that the valve means is operating, the gaseous fluid 61 within the reaction chamber 64 is being compressed. There is no reaction force during initial movement of the force transmitting member 9 as the pressure within the pressurizing chamber 5 of the master cylinder is atmospheric. The only back force being the force of the retraction spring 11. With a forward movement of the push rod 16, the reaction chamber 64 becomes smaller due to the movement of the forward cylindrical portion 80 of the air valve 29 moving axially into the reaction chamber 64. This reduces the volume within the reaction chamber 64 thereby compressing the gaseous fluid 61. Continued forward movement of the force transmitting member 9 closes compensating port 8 and begins the pressurization of hydraulic brake actuating fluid within the chamber 5 of the master cylinder 2. As the pressure builds up within the pressurizing chamber 5, a back force or reaction force is transmitted through force transmitting member 9. The reaction force transmitted through force transmitting member 9 creates a rearward thrust on the forward cup 58 within the reaction chamber 64.

This force causes a compression of gaseous fluid and a reduction of volume within the reaction chamber 64. A reduction in volume increases the pressure within the chamber by compressing the gaseous fluid and transmitting the equal pressure to all portions within the chamber 64. The force is transmitted rearwardly and is distributed between the rear wall 56 of the chamber 64 which forms a portion of the power wall and also the forward face 81 on the forward portion of the air valve element 29.

The noncompressible fluid transmits a force which is proportioned directly according to the area of the forward end 81 of the air valve element and the area of the wall 56 within the reaction housing 25. The pressurization of the compressible fluid 61 and the noncompressible fluid 60 transmits a reaction force in direct proportion to the pressurization within the pressurizing chamber 5 of the master cylinder 2. The delayed time is controlled according to the amount of expansible fluid contained within the container 59. By increasing the amount of incompressible fluid 60 within the container 59, a more firm pedal may be achieved.

As the brake pedal 16 is retracted, the air valve element 29 moves rearwardly to again seat the vacuum valve seat 45 on the vacuum valve element 39. In the position wherein the vacuum valve and the air valve are both closed, the booster is in the "hold" position which holds the present braking effort on the plurality of vehicle brakes. In this position, the reaction transmitted through the reaction chamber 64 is in direct proportion to pressurization of brake actuating chamber 5 and the master cylinder 2. Further rearward movement of the air valve element 29 unseats the air valve element 29 from the air valve seat 46, thereby placing communication between the variable pressure chamber 23 and the constant pressure chamber 20 in the booster unit. The brakes are again returned to their normally retracted position. The reaction chamber again is expanded to its maximum volume due to the expansible nature of the gaseous fluid 61 within the reaction chamber 64.

The reaction means accomplished by an incompressible fluid and a gaseous fluid provides a pedal which gradually increases the reaction force in direct proportion to pressurization in the actuated chamber of the master cylinder. The reaction transmitted is a true reaction force as no loss is encountered in transmitting the force through the reaction means. In other words, the output force through the reaction means is a direct and true reading of the input force transmitted to the opposite side of the reaction means irrespective of whether the brake pedal is moving forwardly or rearwardly. This is due to the fact that there is no hysteresis loss in transmitting of the force through the reaction means. Such a hysteresis loss would be encountered by a type of material such as rubber wherein the output force would vary depending upon the unit deformation of the rubber and also the temperature of the rubber.

While the embodiments of the present invention as herein disclosed, constitute a preferred form, it is to be understood that other forms might be adopted.

What is claimed is as follows:

1. In a brake booster unit a reaction means comprising in combination, a force transmitting member, a power wall forming a reaction chamber, a manually operated member extending into said reaction chamber to form a portion of a first wall of the chamber, said force transmitting member forming at least a portion of a second wall of the chamber, a noncompressible fluid and a compressible fluid contained within said reaction chamber to transmit a reaction force from said force transmitting member to said manually operated member and said power wall in direct proportion to the compression of the compressible fluid when the booster unit is operated.

2. In a brake booster unit, a reaction means comprising in combination, a pressure responsive means, a force transmitting member connected to said pressure responsive means, valve means in said pressure responsive means for controlling the movement of said pressure responsive means, manual operating means for controlling said valve means, a reaction chamber formed in said pressure responsive means, said force transmitting member forming at least a portion of the forward wall in said reaction chamber, said manual means forming a portion of the rearward wall of said reaction chamber for receiving a portion of a reaction force transmitted through said reaction chamber, a reaction transmitting body within said reaction chamber including a noncompressible fluid and a compressible fluid for delaying the reaction time, said reaction transmitting body transmitting a reaction force in direct proportion to the reaction force transmitted to said force transmitting body when said booster unit is operated.

3. A brake booster unit comprising in combination, a pressure responsive means, valve means in said pressure responsive means for controlling the movement of said pressure responsive means, manual control means for controlling said valve means, a force transmitting member connected to said pressure responsive means for transmitting a force, a reaction chamber contained within said pressure responsive means, said force transmitting member extending into said reaction chamber, a reaction force transmitting body including a non-compressible fluid and a compressible fluid, said reaction force transmitting body transmitting a reaction force from said force transmitting member to said manual control means thereby transmitting a reaction force to said manual operating means in direct proportion to the pressurization within said reaction chamber when the booster unit is operated.

4. A brake booster unit comprising in combination, a pressure responsive means, valve means contained in said responsive means for controlling movement of said pressure responsive means, manual means for controlling said valve means, a force transmitting body, a container enclosing said force transmitting body, said force transmitting body including an incompressible fluid and a compressible fluid, a reaction chamber in said pressure responsive means having a forward wall formed in part by a force transmitting member and a rearward wall of said reaction chamber formed in part by a portion of said pressure responsive means, a second part of said rearward wall forming a predetermined area relative to said pressure responsive means by reception of a portion of said valve means, said reaction force transmitting body thereby transmitting a reaction force from said force transmitting member to said valve means in direct proportion to the pressurization of fluid within said force transmitting body and providing a delayed reaction in accordance with the pressurization of the compressible fluid in said reaction transmitting body.

5. A brake booster unit comprising in combination, a pressure responsive means, valve means for controlling the movement of said pressure responsive means, manual operating means extending into said pressure responsive means for controlling said valve means, a force transmitting member connected to said pressure responsive means, a reaction chamber in said pressure responsive means, a reaction force transmitting body contained in said reaction chamber including, a deformable container, a compressible fluid enclosed within said container, a noncompressible fluid enclosed within said fluid deformable container, a deformable cover enclosing said container received within said reaction chamber, said pressure transmitting member forming the forward wall of said reaction chamber, said pressure responsive means forming the outer periphery of the rearward wall of said reaction chamber, said manual control means forming the central portion of said rearward wall in said reaction chamber, said reaction force transmitting body thereby transmitting reaction force from said force transmitting member to said pressure responsive means and said manual control means in a predetermined proportion determined by the relative areas on the rearward wall of said pressure responsive means and said manual control member when said booster unit is operated.

6. In a brake booster unit comprising in combination, a pressure responsive means, valve means for controlling the movement of said pressure responsive means, a manual control means for controlling said valve means, a force transmitting member connected to said pressure responsive means, a reaction chamber having a radially outer portion of the rearward wall of said reaction chamber formed by said pressure responsive means, a central portion of said rearward wall formed by said manual control means, a forward wall of said reaction chamber formed in part by said force transmitting member, a reaction force transmitting body including a deformable container, a second container receiving said first container and received within said reaction chamber, a fluid medium received within said first container including a noncompressible fluid and a compressible fluid, said reaction force transmitting body receiving reaction force from said force transmitting member and proportioning said reaction force between said pressure responsive means and said manual control means in accordance with predetermined proportional areas of said force transmitting member and said manual control means and dependent upon the pressurization of the fluid medium contained within said force transmitting body when said booster unit is operated.

7. A brake booster unit comprising in combination, a pressure responsive means, valve means in said pressure responsive means controlling the movements of said pressure responsive means, manual means controlling the operation of said valve means, a force transmitting member connected to said pressure responsive means, a reaction chamber formed within said pressure responsive means, said force transmitting member forming a forward wall of said reaction chamber for axial movement within said reaction chamber, said pressure responsive means forming a portion of the rearward wall of said reaction chamber, said manual control means forming a second portion of said rearward wall of said reaction chamber for actual movement into said reaction chamber, a reaction force transmitting body contained within said reaction chamber, and including a hydraulic fluid, a gaseous fluid, said reaction force transmitting body thereby transmitting a reaction force from said force transmitting member to the rearward wall of said reaction chamber and distributing the reaction force between said pressure responsive means and said manual control means directly proportional to their respective areas and to the degree of pressurization of said fluid mediums within said force transmitting body.

8. A brake booster unit comprising in combination, a pressure responsive means, valve means for controlling the movements of said pressure responsive means, manual control means controlling said valve means extending into said pressure responsive means, a force transmitting member connected to said pressure responsive means, a reaction chamber contained within said pressure responsive means, a forward wall of said reaction chamber formed by a rearward surface of said force transmitting member, a first portion of the rearward wall of said reaction chamber formed by a portion of said pressure responsive means, a second portion of the rearward wall said reaction chamber formed by said manual control means, a reaction force transmitting body including a deformable container, a hydraulic fluid contained within said deformable container, a compressible fluid contained within said deformable chamber, said fluid mediums transmitting a reaction force from said force transmitting member and proportioning the reaction force between said pressure responsive means and said manual control means in direct proportion to the effective areas on the rearward wall of said reaction chamber when said booster unit is in operation.

9. A brake booster unit comprising in combination, a pressure responsive means, a valve means controlling the movements of said pressure responsive means, a manual control means extending into said responsive means controlling said valve means, a force transmitting member connected to said pressure responsive means, a reaction chamber formed by pressure responsive means, a reaction force transmitting body including a fluid container received within said reaction chamber, a hydraulic fluid contained within said container, a gaseous fluid contained within said container, said force transmitting member forming a forward wall of said reaction chamber, said pressure responsive means forming a portion of the area of the rearward wall said reaction chamber, said manual control means forming the remaining portion of the rearward wall of said reaction chamber, said force transmitting body providing a delayed reaction and a gradual build-up of reaction pressure in direct response to pressurization of said fluid mediums as said reaction force is transmitted from said force transmitting member through said fluid mediums to said manual control means.

10. A brake booster unit comprising in combination, a pressure responsive means, valve means controlling the movement of said pressure responsive means, manual operating means extending into said pressure responsive means controlling said valve means, a force transmitting member connected to said pressure responsive means, a variable volume reaction chamber in said pressure responsive means, a reaction force transmitting body contained in said reaction chamber including, a sealed deformable container, a noncompressible fluid enclosed in said container, a compressible fluid enclosed within said fluid container under a predetermined pressure, said force transmitting member forming the forward wall of said reaction chamber, said pressure responsive means forming the outer periphery and a portion of the rearward wall of said reaction chamber, said manual operating means forming the remaining portion of said rearward wall of said reaction chamber, said reaction force transmitting body transmitting a reaction force from said force transmitting member to said pressure responsive means and said manual control means in a predetermined proportion determined by their relative areas formed on the rearward wall of said reaction chamber.

11. A brake booster unit comprising in combination, a pressure responsive means, valve means controlling the movement of said pressure responsive means, manual operating means extending into said pressure responsive means controlling said valve means, a force transmitting member connected to said pressure responsive means, a variable volume reaction chamber formed in said pressure responsive means, a reaction force transmitting body contained in said reaction chamber including, a flexible fluid tight container, a compressible fluid enclosed in said container, a noncompressible fluid enclosed within said container, said force transmitting member forming the forward wall of said reaction chamber and engaging said container, said pressure responsive means forming the outer periphery and a portion of the rearward wall of said reaction chamber, said manual control means forming the remaining portion of said rearward wall of said reaction chamber, said reaction force transmitting body thereby transmitting reaction force from said force transmitting member to said pressure responsive means and said manual control means in a predetermined ratio determined by the relative areas on the rearward wall of said reaction chamber when said booster unit is operated.

No references cited.